United States Patent [19]

Galli

[11] Patent Number: 5,149,053
[45] Date of Patent: Sep. 22, 1992

[54] DISCONNECTION-PREVENTING SAFETY DEVICE FOR LIQUEFIED GAS BOTTLE VALVE FOR USE WITH QUICK-COUPLING CONNECTOR

[75] Inventor: Rosaria Galli, Recco, Italy

[73] Assignee: Rosaria Galli & C. S.A.S., Italy

[21] Appl. No.: 673,806

[22] Filed: Mar. 22, 1991

[30] Foreign Application Priority Data

Jul. 4, 1990 [IT] Italy ................. 12483 A/90

[51] Int. Cl.$^5$ ............................. F16L 37/28
[52] U.S. Cl. .................. 251/149.9; 251/89.5; 251/144
[58] Field of Search ............ 251/142, 148, 144, 149.9, 251/89.5; 137/614.06, 613, 614

[56] References Cited

U.S. PATENT DOCUMENTS

| | | | |
|---|---|---|---|
| 3,628,768 | 12/1971 | Hutt | 251/148 |
| 3,645,496 | 2/1972 | Rawlins | 251/148 |
| 3,792,834 | 2/1974 | Billeter | 251/148 |

*Primary Examiner*—A. Michael Chambers
*Attorney, Agent, or Firm*—Rosenman & Colin

[57] ABSTRACT

Safety device for liquefied gas bottle valves for use with a quick-coupling connector. The device is positively controlled and activated by the same control knob as the valve. The quick-coupling connector can be disconnected only when the valve is completely closed, and vice versa the valve can be opened only when the quick-coupling connector is inserted perfectly, all of which can be effected by a single fixed-amplitude rotation of nearly 360° of the knob. This rotation causes synchronously both the activation of the internal dispensing valve member and the locking of the quick-coupling connector.

13 Claims, 2 Drawing Sheets

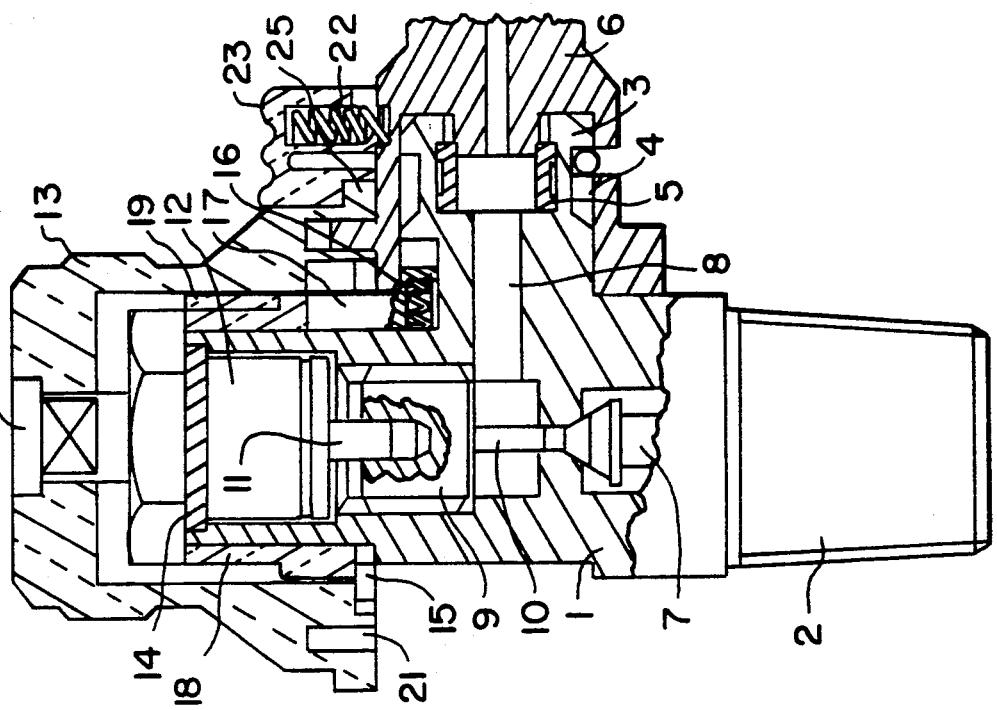
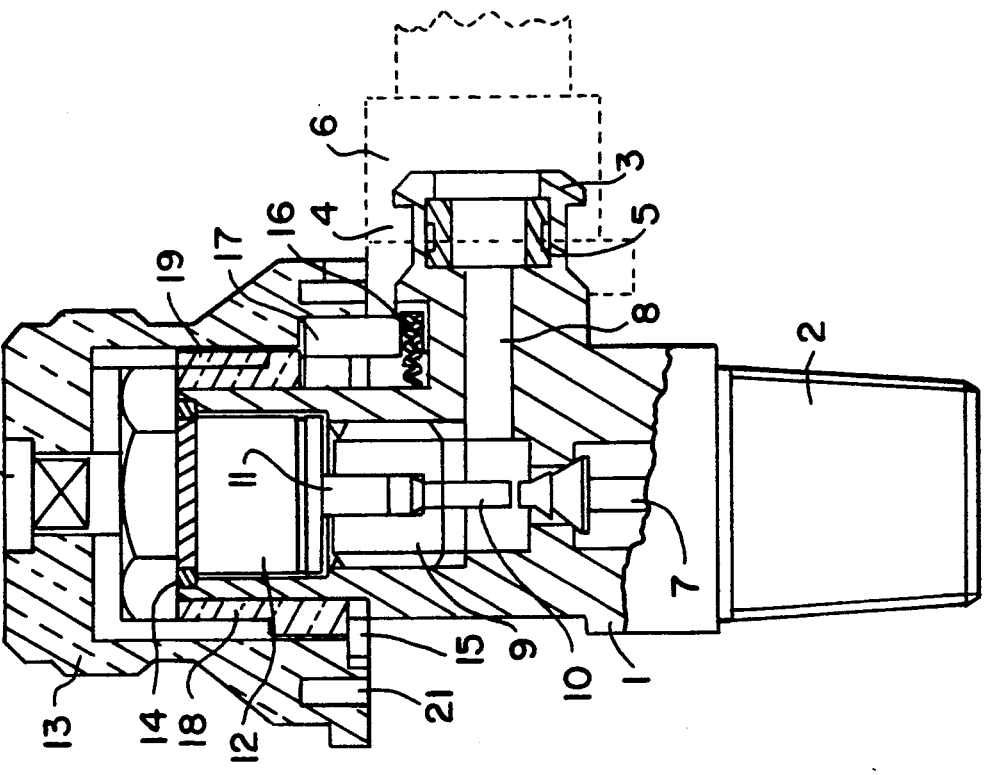

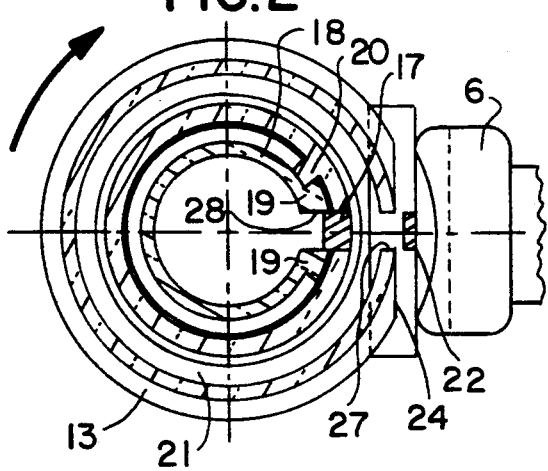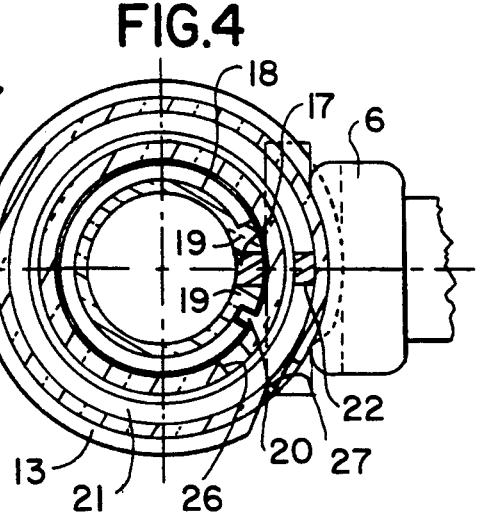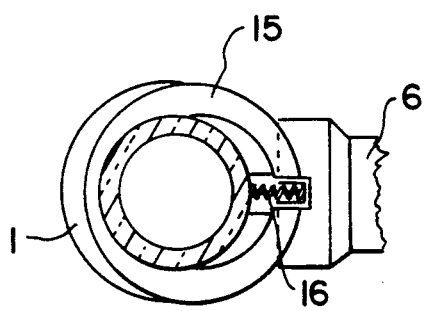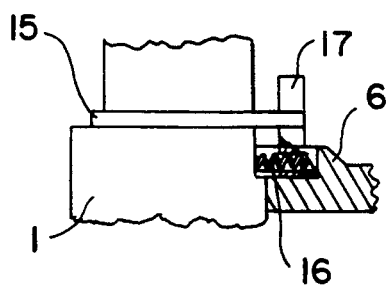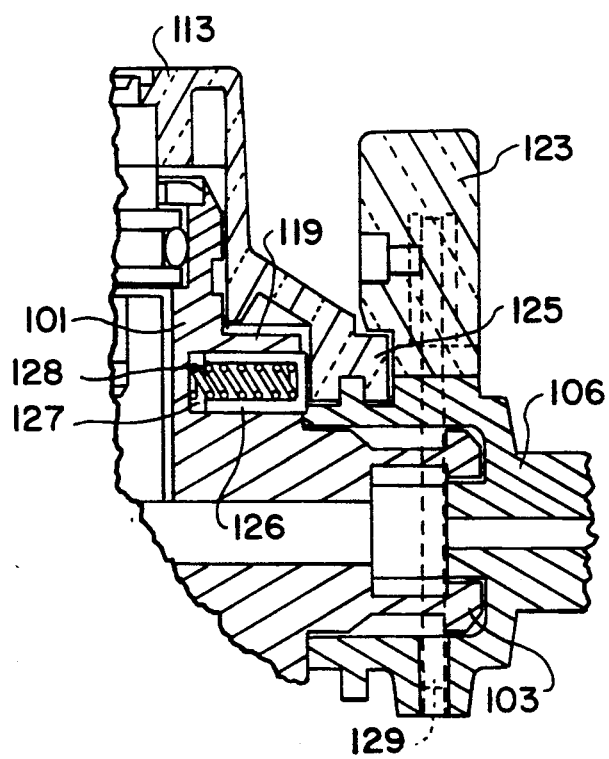

5,149,053

DISCONNECTION-PREVENTING SAFETY DEVICE FOR LIQUEFIED GAS BOTTLE VALVE FOR USE WITH QUICK-COUPLING CONNECTOR

BACKGROUND OF THE INVENTION

The present invention relates to a disconnection-preventing safety device for a liquefied gas bottle valve for use with a quick-coupling connector.

Valves for liquefied gas bottles are often provided at the outlets thereof with quick-coupling connectors, i.e. connectors of the easily connectable and disconnectable type, to minimize the requirements for manual skill in connecting the bottle to the utilization line. However, some dangerous situations have arisen just due to this easy connection (and, therefore, disconnection) between the valve and the quick-coupling connector. Disconnection, in fact, can be easily caused by a shock, an inadvertent manoeuver, or as a result of an imperfect connection, although it does not cause itself any escape of gas even if the valve is open, because a quick-coupling connector is provided with a spring-loaded automatic valve. However, this seemingly riskless disconnection may cause problems: in fact, an absent-minded person might reinstall the connector onto a bottle having an opened valve without checking whether the valves on the user's equipment have been closed, with obvious resulting risks.

OBJECT OF THE INVENTION

Bearing in mind the previous art mentioned above, the main object of the present invention is to provide a valve for liquefied gas bottles provided with a dispensing quick-coupling connector having incorporated therein rationally-designed means ensuring a positive interfunctional relationship between the connection and disconnection means on the quick-coupling connector and the control means for the valve member incorporated in said valve, said valve member being actuated by internal members having a fixed stroke which is obtained by means of a single rotation of about 360° of a control knob on the valve, said knob being designed to act, at the same time, as a member interconnected with the auxiliary locking and safety members of the quick-coupling device, so as to achieve the utmost simplicity in construction.

Substantially, the invention consists of a valve designed to be screwed, as is customary, on the neck of a liquefied gas bottle, or the like, and comprising a side dispensing outlet constructed for engagement with a quick-coupling delivery connector, and comprising therein an axial valve member for spring-controlled opening and closing similarly to the conventional types, excepted the characterizing difference that the upper portion of the valve body comprises an enlarged bore which is threaded internally with a left-handed coarse-pitch threading for a manoeuver stroke of less than one revolution, said bore having screwed therein an intermediate cylindrical member with a lower stem adapted to engage against the end of the valve member, said intermediate member being rotatable by means of a rod carrying a cup-shaped control knob whose lower grooved skirt is engaged with a protrusion of a ring having an eccentric bore, said ring being radially movable and spring-loaded whereby said protrusion can also co-operate with the body of the quick-coupling connector so as to permit the coupling or uncoupling movement only when the knob is exactly in the fully closed position.

Said basic embodiment is conceived so as to be made, if desired, by using—after machining some changes therein—some substantial parts of the conventional valves of this type, with the advantage of utilizing possible spare parts in stock. In case of newly conceived embodiments, the invention devises a specific and rational modified embodiment permitting a faster and more economical industrial production, said modification being hereinafter described, illustrated and claimed.

BRIEF DESCRIPTION OF THE DRAWINGS

The accompanying drawings show, by way of non-limiting examples, a basic embodiment of the invention and a specific modification for a practical production on an industrial scale. In the drawings:

FIG. 1—is an axial sectional view of the valve according to the invention, incorporating the members constituting the inventive disconnection-preventing safety device, the assembly being shown in the closed position, ready to permit the engagement with a quick-coupling connector shown by broken lines;

FIG. 2—is a plan view of FIG. 1, the knob being partly broken away to show some internal members, and the quick-coupling connector about to be engaged being shown partly in the right-hand portion;

FIG. 3—is an axial sectional view of the valve of FIG. 1, wherein the knob has been rotated about 360° to the fully opened position, and the quick-coupling connector has been engaged and locked in a safety condition thanks to the engagement with the grooved skirt of the knob;

FIG. 4—is a plan view of FIG. 3;

FIG. 5—is a detail plan view of the radially-movable eccentric-bore ring provided with a locking and unlocking protrusion;

FIG. 6—is a detail side view of the ring of FIG. 5, showing the upper contrasting protrusion and the lower guidance projection;

FIG. 7—is a detail axial sectional view of a specific modified embodiment for practical production on an industrial scale, with a simplified safety device.

DETAILED DESCRIPTION OF THE PREFERRED EMBODIMENTS

The valve for a liquefied gas bottle or the like, having incorporated therein the safety device according to the invention and shown in the FIGS. 1 to 6 of the accompanying drawings, comprises a body 1 having a lower threaded extension 2 for threaded engagement in the neck of a bottle, and a side dispensing outlet 3 provided with inter-engagement grooves 4 and an inner seal 5 for sealed connection with the quick-coupling connector 6 (shown partially). From the bottom upwards, the differentiated-diameters inner bore of the body 1 houses a spring-loaded opening/closing valve member 7, a radial outlet duct 8, an intermediate cylindrical member 9 having a valve control stem 10 and an outer left-handed coarse-pitch threading, a control rod 11 with a two-face milled head for insertion into the member 9, rotatably guided in the plug 12 and provided at the top with a faceted seat 29 for connection with the control knob 13. The plug 12 is formed with an outer threading and is provided with an annular seal 14.

The body 1 is provided at the top thereof with a cylindrical neck portion of comparatively smaller diameter having a lower shoulder which supports an eccentric-bore ring 15 which is movable radially as permitted by its eccentricity and is urged by a small spring 16 acting against the lower part of the projection 17 of said ring. Mounted on the cylindrical neck of said body 1 is a bush 18 having at the bottom thereof a notch 28 for engagement with a protrusion of the ring 15 to prevent its rotation, while at the top thereof, in registry with said notch, it has a protruding dog 19 acting as a limit stop against the rotation of the knob 13 which is of cup-shape and is provided with a corresponding suitable abutting stop 20. Therefore, the knob 13 can effect a rotation slightly smaller than a round angle, and by rotation of such an amplitude, thanks to the coarse-pitch threading of the member 9, the exact axial stroke required for opening and closing the valve member 7 is obtained.

In order to achieve the forced synchronism of the disconnection-preventing locking step and the disconnection-permitting releasing step by moving the control knob, said knob, in addition to an inner shoulder supporting the suitably positioned bush 18, is provided in the lower skirt of its cup-shape with a groove 21 wherein a dog 22 of the quick-coupling connector becomes engaged. Said groove is provided with a single passage-notch 26, 27 corresponding to the closed position (shown in FIG. 2) of the knob; therefore, only at said position the dog 22 can become disengaged together with the quick-coupling connector 6 which is integral therewith. Obviously, to obtain the disengagement, also the button 23 of the respective usual release system shall be acted upon concurrently, and it is to be noted that said release system, thanks to said provisions, will be enabled only in the exact closed position of the knob 13 and, therefore, of the valve. In any other position, even by acting on said release button 23, the quick-coupling connector cannot be disconnected, which is the main result of the device according to the invention.

Finally, it is to be noted that the knob 13, in order to enable the quick-coupling connector 6 to be advanced suitably to the coupled position when the valve is closed, comprises a planar tangential flat 24 on its side face at both sides of the passage-notch 27 for the dog 22.

The knob 13, finally, may be provided with a further peripheral rim 25 for an additional safety feature against any undesired disconnection of the quick-coupling connector. In fact, by becoming inserted under the button 23, said rim prevents the actuation of said button and the resulting disconnection of the quick-coupling connector. Said actuation and disconnection can only occur when the valve is closed, because at that position a slot of sufficient amplitude through said tangential flat 24 permits the button 23 to become disengaged.

The above description is referred, as mentioned in the introductory part, to a basic embodiment of the invention, said embodiment mainly permitting, after machining few changes, the use of the body 1, (FIGS. 1-4) of a conventional valve. In case of an advantageous industrial mass production, the invention provides a preferred modification as shown in FIG. 7. In this embodiment, the bush 18, inserted in the upper portion of the body 1 (FIGS. 1-4) and having the limit dog 19 (FIGS. 1-4) which may be formed integral with said body 1 at a suitable position, is omitted and, "in lieu" thereof, the modified body 101 comprises a projection 119 as an alternative to the dog 19 (FIGS. 1-4).

As a consequence, due to the absence of the peculiar locking function of the bush 18, the eccentric-bore ring 15 may be eliminated and replaced by a simple radially slidable member 126 accommodated in a blind hole 127 provided in a suitable protrusion formed outside of the body 101, said member 126 being urged by a spring 128 having the same function as the spring 16 of the basic embodiment. As it can be seen clearly in FIG. 7, the member 126 is in such a position whereby its outer end can act both on the inner edge of the knob 113 and on the respective annular ridge of the quick-coupling connector 106, thus ensuring the desired safety locking of the knob in a very simple manner.

As to the button 123 of the usual locking system, it is to be noted, finally, that it may also be constructed (FIG. 7) with an inner fork-like member 129 which is inserted slidably into a suitable transverse slit so as to become engaged directly on the neck of the outlet of the body 101.

In order to achieve an increased safety in case of fire, the invention does not exclude that the intermediate cylindrical member 9 and valve control stem 10, forming a part of the inner components of the valve, may be constructed as a unitary member of plastics material which is rugged but suitably heat-sensitive, whereby in case of overheating due to a fire, said member will melt to close automatically the gas outlet of the bottle thanks to the now unobstructed action of the spring (not shown) of the valve member 7.

Obviously, on the basis of the same inventive principle, further changes and modifications are possible, all within the scope of protection of the patent and attendant following claims.

I claim:
1. A safety arrangement for a bottle containing liquefied gas to be dispensed, comprising:
   (a) a valve body having an inlet for mounting the body on the bottle, a discharge outlet for dispensing the liquefied gas, and a flow passage extending from the inlet to the outlet;
   (b) a valve member mounted in the passage for movement from a normally-closed position in which the liquefied gas is blocked from the discharge outlet, to an open position in which the liquefied gas flows along the passage to the discharge outlet;
   (c) a manually-operated knob mounted on the body for turning movement about an axis between angularly-offset, end-limiting positions;
   (d) means operatively connecting the knob in a force-transmitting relationship to the valve member to move the valve member from the normally-closed position to the open position;
   (e) a coupler for connection to, and disconnection from, the discharge outlet to selectively conduct the liquefied gas therefrom;
   (f) alignment means for permitting said connection and disconnection of the coupler only when the valve member is in the normally-closed position; and
   (g) means for locking the knob to prevent movement of the valve member to the open position upon said disconnection of the coupler, and for unlocking the knob upon said connection of the coupler.

2. The arrangement according to claim 1; and further comprising a bushing mounted on the valve body, said bushing having a pair of angularly-offset abutments, and wherein the knob has an interior stop for abutting engagement with the abutments.

3. The arrangement according to claim 2, wherein the abutments are angularly spaced apart at an obtuse angle less than 360°.

4. The arrangement according to claim 1, wherein the knob has a cylindrical side wall, and wherein the alignment means includes an alignment projection on the coupler, and an opening formed through the side wall of the knob and facing the alignment projection in the normally-closed position, said opening being dimensioned to allow the alignment projection to pass therethrough radially of the axis.

5. The arrangement according to claim 4, wherein the alignment means includes an annular passageway in communication with said opening, said annular passageway being dimensioned to allow the alignment projection to pass therealong about the axis during the turning movement of the knob.

6. The arrangement according to claim 1, wherein the locking means includes a locking ring eccentrically mounted on the body for radial movement relative to the axis, a locking projection mounted on the locking ring, and a locking spring in tensioned engagement between the body and the locking ring for urging the projection into locking engagement with the knob.

7. The arrangement according to claim 6, and further comprising a bushing mounted on the valve body, said bushing having a radial opening for receiving the locking projection upon said connection of the coupler.

8. The arrangement according to claim 1, wherein the locking means includes a locking member, a radial bore formed in the body for receiving the locking member, and a locking spring mounted in the radial bore between the body and the locking member for urging the locking member into locking engagement with the knob.

9. The arrangement according to claim 8, wherein the locking member has an end region engaging the coupler upon said connection of the coupler.

10. The arrangement according to claim 1, wherein the means connecting the knob and the valve member include an axial rod reciprocally movable along the axis, a threaded member mounted for turning movement in a threaded bore formed axially in the body, said rod being mounted to the threaded member, and said knob being connected to the threaded member.

11. The arrangement according to claim 1, wherein the flow passage includes an axial passage portion in which the valve member is mounted, and a radial passage portion extending radially of the axis; and wherein the discharge outlet is mounted at a lateral side of the valve body.

12. The arrangement according to claim 1, wherein the knob has a peripheral rim that has a generally circular portion and a flattened portion at the discharge outlet.

13. The arrangement according to claim 12, and further comprising quick release means on the coupler including a manually-operable button having a recess, and wherein the flattened portion extends radially of the axis for reception in the recess upon said connection of the coupler.

* * * * *